(12) United States Patent
Quinn (10) Patent No.: US 11,718,066 B2
(45) Date of Patent: Aug. 8, 2023

(54) HIGH STRENGTH ADHESIVE TAPE

(71) Applicant: Fiber Fix USA, LLC, American Fork, UT (US)

(72) Inventor: Reed Quinn, Orem, UT (US)

(73) Assignee: JBW Fiber Fix Holdings, LLC, Marietta, GA (US)

( * ) Notice: Subject to any disclaimer, the term of this patent is extended or adjusted under 35 U.S.C. 154(b) by 243 days.

(21) Appl. No.: 16/727,776

(22) Filed: Dec. 26, 2019

(65) Prior Publication Data

US 2020/0139669 A1 May 7, 2020

Related U.S. Application Data (63) Continuation of application No. 15/495,795, filed on Apr. 24, 2017, now abandoned.

(51) Int. Cl.
| | |
|---|---|
| *B32B 5/26* | (2006.01) |
| *B32B 5/02* | (2006.01) |
| *B32B 7/12* | (2006.01) |
| *B32B 27/36* | (2006.01) |
| *B32B 27/32* | (2006.01) |

(52) U.S. Cl.
CPC ............ *B32B 5/26* (2013.01); *B32B 5/028* (2013.01); *B32B 7/12* (2013.01); *B32B 27/32* (2013.01); *B32B 27/36* (2013.01); *B32B 2255/02* (2013.01); *B32B 2262/0253* (2013.01); *B32B 2262/0284* (2013.01); *B32B 2405/00* (2013.01)

(58) Field of Classification Search
None
See application file for complete search history.

(56) References Cited

U.S. PATENT DOCUMENTS

| | | | |
|---|---|---|---|
| 4,636,427 A | 1/1987 | Ohno et al. | |
| 5,178,924 A | 1/1993 | Johnson et al. | |
| 5,283,117 A | 2/1994 | Arai et al. | |
| 8,986,831 B2 | 3/2015 | Bradshaw et al. | |
| 2008/0213526 A1 | 9/2008 | Serra et al. | |
| 2012/0118469 A1 | 5/2012 | Joly et al. | |
| 2013/0316165 A1 | 11/2013 | Yamamoto et al. | |
| 2014/0191431 A1 | 7/2014 | Uehara et al. | |
| 2014/0234562 A1 | 8/2014 | Traser et al. | |
| 2014/0290165 A1 | 10/2014 | Spanton et al. | |
| 2014/0367040 A1 | 12/2014 | Traser et al. | |
| 2015/0132523 A1 | 5/2015 | Heinemann | |
| 2015/0337179 A1 | 11/2015 | LeWandowski et al. | |
| 2016/0083628 A1 | 3/2016 | Heimink et al. | |
| 2016/0096980 A1 | 4/2016 | Wieneke et al. | |
| 2016/0339672 A1 | 11/2016 | Kagiyama et al. | |
| 2017/0321089 A1 | 11/2017 | Bieber et al. | |
| 2017/0369749 A1 | 12/2017 | Qie et al. | |

*Primary Examiner* — Arti Singh-Pandey
(74) *Attorney, Agent, or Firm* — Nelson Mullins Riley & Scarborough LLP (57) ABSTRACT

A high strength adhesive tape. The high strength adhesive tape includes a scrim layer and a fabric layer. The high strength adhesive tape also includes a first adhesive layer, where the first adhesive layer attaches the fabric layer to the scrim layer. The high strength adhesive tape further includes a second adhesive layer, where the second adhesive layer is configured to form a bond between the high strength adhesive tape and an external object.

25 Claims, 5 Drawing Sheets

HIGH STRENGTH ADHESIVE TAPE

CROSS-REFERENCE TO RELATED APPLICATIONS

This application is a continuation of U.S. patent application Ser. No. 15/495,795, filed on Apr. 24, 2017, the entire disclosure of which is incorporated by reference herein.

BACKGROUND OF THE INVENTION

Adhesive tape is a common household item and used for a variety of tasks. For example, common types of adhesive tape such as masking tape and duct tape are found in countless homes and workplaces. For these tapes, the three specifications that are the most important are: 1) adhesive strength; 2) ability to rip or cut pieces; and 3) strength of tape during use. For example, with masking tape adhesive is the key element to its usefulness, as it allows the tape to be easily removed without leaving residue or damaging the surface to which it is applied. In contrast, duct tape normally has a stronger adhesive and is stronger during use. Therefore, masking tape is used in temporary settings (such as creating borders during painting) whereas duct tape is sued in more semi-permanent and permanent settings (such as during a repair).

Nevertheless, existing adhesive tapes still suffer from a number of problems. For example, tape that is easy to tear will eventually fail in most repairs. Making an adhesive tape that is stronger than duct tape is not difficult. Making something much stronger than duct tape but still cost competitive and easy for consumers to use is extremely difficult. In addition, tapes tend to become stressed when exposed to extremes in temperatures, such as in outdoor applications.

Accordingly, there is a need in the art for a tape that is stronger than duct tape but can be used by a consumer. Further, there is a need in the art for the tape to be cost competitive with other adhesive tapes.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One example embodiment includes a high strength adhesive tape. The high strength adhesive tape includes a scrim layer and a fabric layer. The high strength adhesive tape also includes a first adhesive layer, where the first adhesive layer attaches the fabric layer to the scrim layer. The high strength adhesive tape further includes a second adhesive layer, where the second adhesive layer is configured to form a bond between the high strength adhesive tape and an external object.

Another example embodiment includes a method of producing a high strength adhesive tape. The method includes providing a scrim layer and coating a first side of the scrim layer with an adhesive. The method also includes treating a second side of the scrim layer with an anti-stick agent, where the second side of the scrim layer is opposite the first layer. The method further includes providing a fabric layer and attaching a first side of the fabric layer to the first side of the scrim layer using the adhesive on the first side of the scrim layer. The method additionally includes coating a second side of the fabric layer with an adhesive, where the second side of the scrim layer is opposite the first layer.

These and other objects and features of the present invention will become more fully apparent from the following description and appended claims, or may be learned by the practice of the invention as set forth hereinafter.

BRIEF DESCRIPTION OF THE DRAWINGS

To further clarify various aspects of some example embodiments of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Reference will now be made to the figures wherein like structures will be provided with like reference designations. It is understood that the figures are diagrammatic and schematic representations of some embodiments of the invention, and are not limiting of the present invention, nor are they necessarily drawn to scale.

Figure 1:
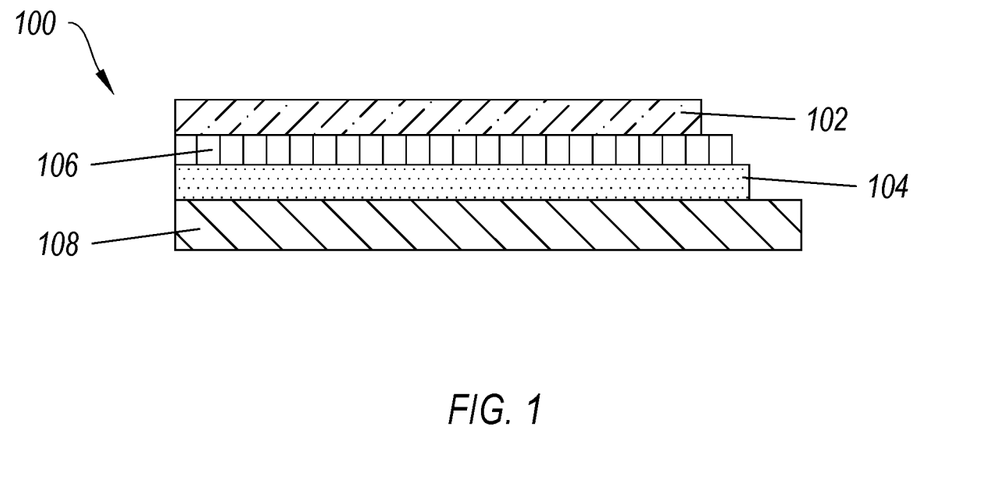
FIG. 1 illustrates an example of a high strength adhesive tape.

FIG. 1 illustrates an example of a high strength adhesive tape 100. The high strength adhesive tape 100 includes any tape that has an adhesive to attach the tape to an external object. For example, the high strength adhesive tape 100 can be used to join objects, repair objects or for any other desired purpose.

FIG. 1 shows that the high strength adhesive tape 100 can include a scrim layer 102. The scrim layer 102 includes a strong fabric or film. In use, the scrim layer 102 is the outer layer of the high strength adhesive tape 100 which is not adhered to the external object. The scrim layer 102 can be thick enough to prevent adhesive leakage but thin enough to allow for cutting when desired. For example, the scrim layer can be between 40 µm and 60 µm thick. E.g., the scrim layer 102 can be approximately 50 µm. As used in the specification and the claims, the term approximately shall mean that the value is within 10% of the stated value, unless otherwise specified.

The scrim layer 102 can include any desired material. For example, the scrim layer can include a polyethylene terephthalate (PET) film. PET (sometimes written poly(ethylene terephthalate)), is the most common thermoplastic polymer resin of the polyester family. In some instances, PET is called polyester even though the term "polyester" may include materials other that PET and polyester typically refers to the woven fabric. PET has a chemical formula of $(C_{10}H_8O_4)_n$, an IUPAC name of Poly(ethyl benzene-1,4-dicarboxylate) and a CAS number of 25038-59-9.

FIG. 1 also shows that the high strength adhesive tape 100 can include a fabric layer 104. The fabric layer 104 adds strength and durability to the high strength adhesive tape 100. I.e., the fabric prevents the high strength adhesive tape 100 from ripping or tearing when in use. However, the fabric layer 104 must be thin enough that the user can cut through the high strength adhesive tape 100 when desired. That is, the fabric layer 104 must be thin enough to be cut but thick enough to provide the desired strength. For example, the gram mage of the fabric layer 104 can be between 85 g/m² and 130 g/m². E.g., the grammage of the fabric layer 104 can be approximately 105 g/m² to 110 g/m². The "thickness" or "density" of a fabric layer is usually measured in of mass of the product per unit of area (called "paper density"). The paper density expressed in g/m² is called grammage.

The fabric layer 104 can include any desired material. For example, the fabric layer 104 can include polyethylene fabric. Polyethylene fabrics are strong and the fibers do not stretch (thus, the expansion rate is dictated almost entirely by the weave of the fabric). Polyethylene resists cuts, ripping and tearing. Thus, polyethylene fabric can provide the desired strength and prevent delamination of the high strength adhesive tape 100, as described below. Polyethylene has a chemical formula $(C_2H_4)_n$, an IUPAC name of polyethene (or poly(m ethylene)) and a CAS number of 9002-88-4. The polyethylene is used to create threads which are woven into the desired fabric. A polyethylene fabric of the above gram mage is a low-tension fabric which expands and contracts at very close to the same rate as the example scrim layer 102 described above.

FIG. 1 further shows that the high strength adhesive tape 100 can include a first adhesive layer 106. The first adhesive layer 106 can be used to attach the scrim layer 102 and the fabric layer 104 to one another. That is, the first adhesive layer ensures that the scrim layer 102 and the fabric layer 104 remain attached to work together to create the desired tape strength. The amount of adhesive in the first adhesive layer 106 can be any amount sufficient to attach the scrim layer 102 to the fabric layer 104. For example, the grammage of the first adhesive layer 106 can be between 45 g/m² and 65 g/m². E.g., the grammage of the first adhesive layer 106 can be approximately 55 g/m².

The first adhesive layer can include any desired adhesive. For example, the adhesive can be a pressure-sensitive adhesive. Pressure-sensitive adhesive (PSA, self-adhesive, self-stick adhesive) is adhesive which forms a bond when pressure is applied to marry the adhesive with the adherend. I.e., no solvent, water, or heat is needed to activate the adhesive. As the name "pressure-sensitive" indicates, the degree of bond may be influenced by the amount of pressure which is used to apply the adhesive to the surface. Adhesives may be broadly divided in two classes: structural and pressure-sensitive. To form a permanent bond, structural adhesives harden via processes such as evaporation of solvent (for example, white glue), reaction with UV radiation (as in dental adhesives), chemical reaction (such as two-part epoxy), or cooling (as in hot melt). In contrast, pressure-sensitive adhesives form a bond simply by the application of pressure to marry the adhesive with the adherend.

FIG. 1 additionally shows that the high strength adhesive tape 100 can include a second adhesive layer 108. The second adhesive layer 108 allows the high strength adhesive tape 100 to attach to an external object. The amount of adhesive in the second adhesive layer 108 can be any amount sufficient to attach to the external object. For example, the grammage of the second adhesive layer 108 can be between 70 g/m² and 100 g/m². E.g., the grammage of the second adhesive layer 108 can be approximately 85 g/m².

A high strength adhesive tape 100 with the above specifications (i.e., a PET scrim layer 102 of approximately 50 μm, a polyethylene fabric layer 104 with a grammage of approximately 105 g/m² to 110 g/m², a first adhesive layer 102 with a grammage of approximately 55 g/m², and a second adhesive layer 108 with a grammage of approximately 85 g/m²) can have a thickness of 310 μm, an adhesion strength of 42 N/25 mm, a tensile strength of 950 N/50 mm and a freight on board (FOB) cost of $2.35. Further the high strength adhesive tape 100 would resist deformation, as described below.

Figure 2:
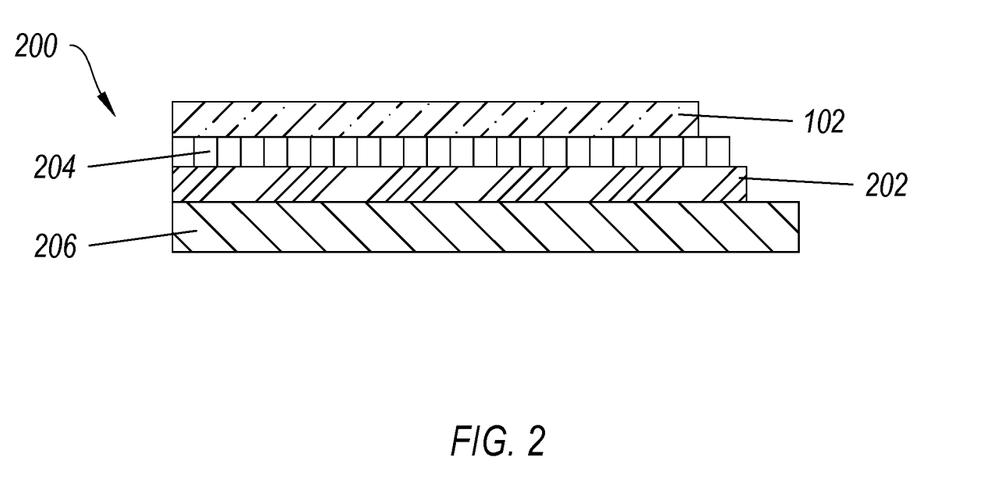
FIG. 2 illustrates an alternative example of a high strength adhesive tape.

FIG. 2 illustrates an alternative example of a high strength adhesive tape 200. The high strength adhesive tape 200 can likewise resist deformation but have different properties, as described below. For example, the high strength adhesive tape 200 can be used to join objects, repair objects or for any other desired purpose.

FIG. 2 shows that the high strength adhesive tape 200 can include a scrim layer 102 similar to the scrim layer of FIG. 1. For example, the scrim layer can be between 40 μm and 60 μm thick. E.g., the scrim layer 102 can be approximately 50 μm. Likewise, the scrim layer 102 can be a PET film or any other desired material.

FIG. 2 also shows that the high strength adhesive tape 200 can include a fabric layer 202. The fabric layer 202 adds strength and durability to the high strength adhesive tape 200. I.e., the fabric prevents the high strength adhesive tape 200 from ripping or tearing when in use. However, the fabric layer 202 must be thin enough that the user can cut through the high strength adhesive tape 200 when desired. That is, the fabric layer 202 must be thin enough to be cut but thick enough to provide the desired strength. For example, the gram mage of the fabric layer 202 can be between 30 g/m² and 46 g/m². E.g., the grammage of the fabric layer 202 can be approximately 38 g/m².

The fabric layer 202 can include any desired material. For example, the fabric layer 202 can include glass fibers. For example, the fabric layer 202 can include woven fiberglass of a fiberglass net. A fiberglass net of the above grammage is a low-tension fabric which expands and contracts at very close to the same rate as the example scrim layer 102 described above.

FIG. 2 further shows that the high strength adhesive tape 200 can include a first adhesive layer 204. The first adhesive layer 204 can be used to attach the scrim layer 102 and the fabric layer 202 to one another. That is, the first adhesive layer ensures that the scrim layer 102 and the fabric layer 202 remain attached to work together to create the desired tape strength. The amount of adhesive in the first adhesive layer 204 can be any amount sufficient to attach the scrim layer 102 to the fabric layer 202. For example, the grammage of the first adhesive layer 204 can be between 25 g/m² and 45 g/m². E.g., the grammage of the first adhesive layer 204 can be approximately 35 g/m². The first adhesive 204 layer can include any desired adhesive, as described above.

FIG. 2 additionally shows that the high strength adhesive tape 200 can include a second adhesive layer 206. The second adhesive layer 206 allows the high strength adhesive tape 200 to attach to an external object. The amount of adhesive in the second adhesive layer 206 can be any amount sufficient to attach to the external object. For example, the grammage of the second adhesive layer 206 can be between 90 g/m$^2$ and 130 g/m$^2$. E.g., the grammage of the second adhesive layer 206 can be approximately 110 g/m$^2$.

A high strength adhesive tape 200 with the above specifications (i.e., a PET scrim layer 102 of approximately 50 μm, a fiberglass fabric layer 202 with a grammage of approximately 38 g/m$^2$, a first adhesive layer 204 with a grammage of approximately 35 g/m$^2$, and a second adhesive layer 206 with a gram mage of approximately 110 g/m$^2$) can have a thickness of 210 μm, an adhesion strength of 51 N/25 mm, a tensile strength of 1210 N/50 mm and an FOB cost of $1.55. Further the high strength adhesive tape 200 would resist deformation, as described below.

Figure 3:
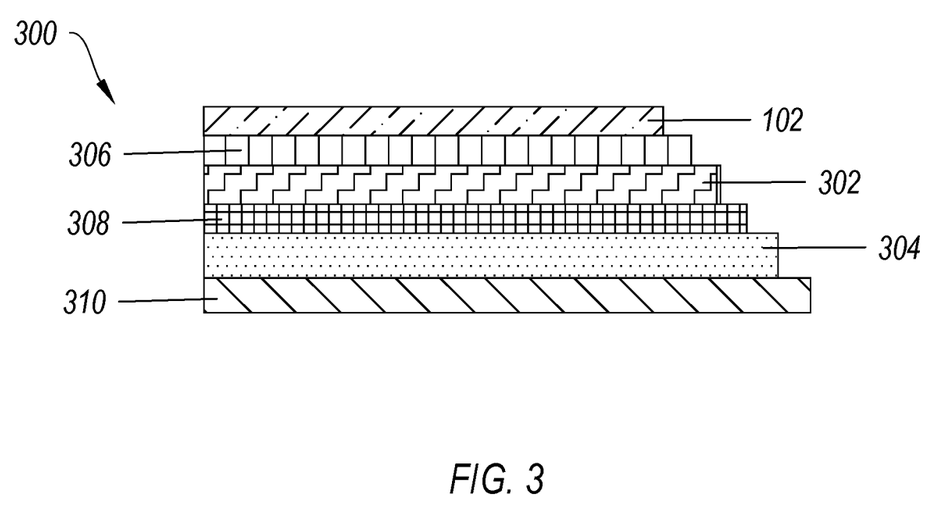
FIG. 3 illustrates an alternative example of a high strength adhesive tape.

FIG. 3 illustrates an alternative example of a high strength adhesive tape 300. The high strength adhesive tape 300 can likewise resist deformation but have different properties, as described below. For example, the high strength adhesive tape 300 can be used to join objects, repair objects or for any other desired purpose.

FIG. 3 shows that the high strength adhesive tape 300 can include a scrim layer 102 similar to the scrim layer of FIG. 1. For example, the scrim layer can be between 40 μm and 60 μm thick. E.g., the scrim layer 102 can be approximately 50 μm. Likewise, the scrim layer 102 can be a PET film or any other desired material.

FIG. 3 also shows that the high strength adhesive tape 300 can include a first fabric layer 302. The first fabric layer 302 adds strength and durability to the high strength adhesive tape 300. I.e., the fabric prevents the high strength adhesive tape 300 from ripping or tearing when in use. However, the first fabric layer 302 must be thin enough that the user can cut through the high strength adhesive tape 300 when desired. That is, the first fabric layer 302 must be thin enough to be cut but thick enough to provide the desired strength. For example, the gram mage of the first fabric layer 302 can be between 45 g/m$^2$ and 65 g/m$^2$. E.g., the grammage of the first fabric layer 302 can be approximately 55 g/m$^2$.

The first fabric layer 302 can include any desired material. For example, the first fabric layer 302 can include glass fibers. For example, the first fabric layer 302 can include woven fiberglass or a fiberglass net. A fiberglass net of the above grammage is a low-tension fabric which expands and contracts at very close to the same rate as the example scrim layer 102 described above.

FIG. 3 additionally shows that the high strength adhesive tape 300 can include a second fabric layer 304. The second fabric layer 304 can include a different material that expands and contracts at very close to the same rate as the example scrim layer 102 described above. For example, the second fabric layer 304 can include a polyethylene fabric with a grammage of between 65 g/m$^2$ and 95 g/m$^2$. E.g., the gram mage of the second fabric layer 304 can be approximately 80 g/m$^2$.

FIG. 3 further shows that the high strength adhesive tape 300 can include a first adhesive layer 306. The first adhesive layer 306 can be used to attach the scrim layer 102 and the first fabric layer 302 to one another. That is, the first adhesive layer ensures that the scrim layer 102 and the first fabric layer 302 remain attached to work together to create the desired tape strength. The amount of adhesive in the first adhesive layer 306 can be any amount sufficient to attach the scrim layer 102 to the first fabric layer 302. For example, the grammage of the first adhesive layer 306 can be between 20 g/m$^2$ and 30 g/m$^2$. E.g., the gram mage of the first adhesive layer 306 can be approximately 25 g/m$^2$. The first adhesive layer 306 can include any desired adhesive, as described above.

FIG. 3 moreover shows that the high strength adhesive tape 300 can include a second adhesive layer 308. The second adhesive layer 306 can be used to attach the first fabric layer 302 and the second fabric layer 304 to one another. That is, the second adhesive layer ensures that the first fabric layer 302 and the second fabric layer 304 remain attached to work together to create the desired tape strength. The amount of adhesive in the second adhesive layer 306 can be any amount sufficient to attach the first fabric layer 302 to the second fabric layer 304. For example, the grammage of the second adhesive layer 306 can be between 20 g/m$^2$ and 30 g/m$^2$. E.g., the grammage of the second adhesive layer 306 can be approximately 25 g/m$^2$. The second adhesive layer 308 can include any desired adhesive, as described above FIG. 3 additionally shows that the high strength adhesive tape 300 can include a third adhesive layer 310. The third adhesive layer 310 allows the high strength adhesive tape 300 to attach to an external object. The amount of adhesive in the third adhesive layer 310 can be any amount sufficient to attach to the external object. For example, the grammage of the third adhesive layer 310 can between 70 g/m$^2$ and 100 g/m$^2$. E.g., the grammage of the third adhesive layer 310 can be approximately 85 g/m$^2$.

A high strength adhesive tape 300 with the above specifications (i.e., a PET scrim layer 102 of approximately 50 μm, a fiberglass first fabric layer 302 with a grammage of approximately 55 g/m$^2$, a polyethylene second fabric layer 304 with a grammage of approximately to 80 g/m$^2$, a first adhesive layer 306 with a grammage of approximately 25 g/m$^2$, a second adhesive layer 308 with a grammage of approximately 35 g/m$^2$, and a third adhesive layer 310 with a grammage of approximately 85 g/m$^2$) can have a thickness of 320 μm, an adhesion strength of 42 N/25 mm, a tensile strength of 1150 N/50 mm and an FOB cost of $1.85. Further the high strength adhesive tape 300 would resist deformation, as described below.

Figure 4:
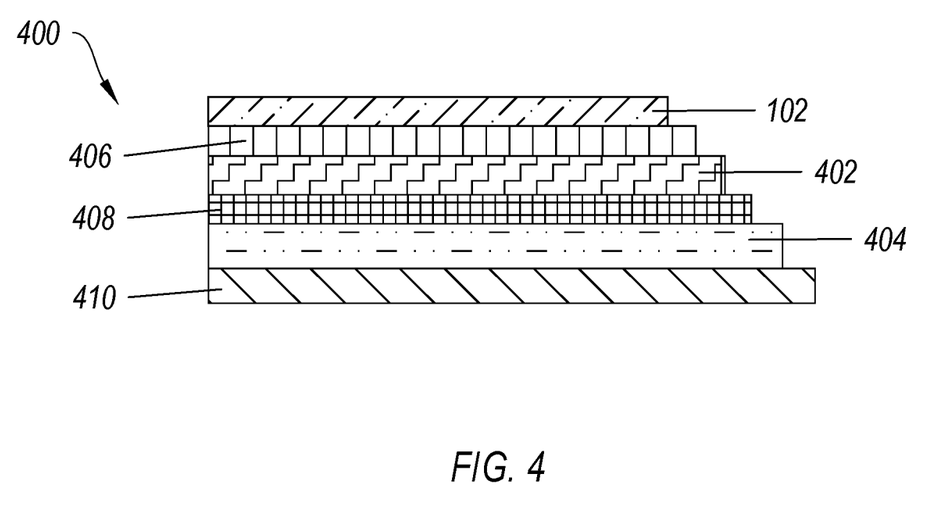
FIG. 4 illustrates an alternative example of a high strength adhesive tape.

FIG. 4 illustrates an alternative example of a high strength adhesive tape 400. The high strength adhesive tape 400 can likewise resist deformation but have different properties, as described below. For example, the high strength adhesive tape 400 can be used to join objects, repair objects or for any other desired purpose.

FIG. 4 shows that the high strength adhesive tape 400 can include a scrim layer 102 similar to the scrim layer of FIG. 1. For example, the scrim layer can be between 40 μm and 60 μm thick. E.g., the scrim layer 102 can be approximately 50 μm. Likewise, the scrim layer 102 can be a PET film or any other desired material.

FIG. 4 also shows that the high strength adhesive tape 400 can include a first fabric layer 402. The first fabric layer 402 adds strength and durability to the high strength adhesive tape 400. I.e., the fabric prevents the high strength adhesive tape 400 from ripping or tearing when in use. However, the first fabric layer 402 must be thin enough that the user can cut through the high strength adhesive tape 400 when desired. That is, the first fabric layer 402 must be thin enough to be cut but thick enough to provide the desired strength. For example, the gram mage of the first fabric layer 402 can be between 45 g/m² and 65 g/m². E.g., the grammage of the first fabric layer 402 can be approximately 55 g/m².

The first fabric layer 402 can include any desired material. For example, the first fabric layer 402 can include glass fibers. For example, the first fabric layer 402 can include woven fiberglass or a fiberglass net. A fiberglass net of the above grammage is a low-tension fabric which expands and contracts at very close to the same rate as the example scrim layer 102 described above.

FIG. 4 additionally shows that the high strength adhesive tape 400 can include a second fabric layer 404. The second fabric layer 404 can include a different material that expands and contracts at very close to the same rate as the example scrim layer 102 described above. For example, the second fabric layer 404 can include a nonwoven fabric with a grammage of between 20 g/m² and 30 g/m². E.g., the grammage of the second fabric layer 404 can be approximately 25 g/m². Nonwoven fabric is a fabric-like material made from long fibers, bonded together by chemical, mechanical, heat or solvent treatment. The term is used in the textile manufacturing industry to denote fabrics, such as felt, which are neither woven nor knitted.

FIG. 4 further shows that the high strength adhesive tape 400 can include a first adhesive layer 406. The first adhesive layer 406 can be used to attach the scrim layer 102 and the first fabric layer 402 to one another. That is, the first adhesive layer ensures that the scrim layer 102 and the first fabric layer 402 remain attached to work together to create the desired tape strength. The amount of adhesive in the first adhesive layer 406 can be any amount sufficient to attach the scrim layer 102 to the first fabric layer 402. For example, the grammage of the first adhesive layer 406 can be between 20 g/m² and 30 g/m². E.g., the gram mage of the first adhesive layer 406 can be approximately 25 g/m². The first adhesive layer 406 can include any desired adhesive, as described above.

FIG. 4 moreover shows that the high strength adhesive tape 400 can include a second adhesive layer 408. The second adhesive layer 406 can be used to attach the first fabric layer 402 and the second fabric layer 404 to one another. That is, the second adhesive layer ensures that the first fabric layer 402 and the second fabric layer 404 remain attached to work together to create the desired tape strength. The amount of adhesive in the second adhesive layer 406 can be any amount sufficient to attach the first fabric layer 402 to the second fabric layer 404. For example, the grammage of the second adhesive layer 406 can be between 20 g/m² and 30 g/m². E.g., the grammage of the second adhesive layer 406 can be approximately 25 g/m². The second adhesive layer 408 can include any desired adhesive, as described above FIG. 4 additionally shows that the high strength adhesive tape 400 can include a third adhesive layer 410. The third adhesive layer 410 allows the high strength adhesive tape 400 to attach to an external object. The amount of adhesive in the third adhesive layer 410 can be any amount sufficient to attach to the external object. For example, the grammage of the third adhesive layer 410 can between 100 g/m² and 150 g/m². E.g., the grammage of the third adhesive layer 410 can be approximately 125 g/m².

A high strength adhesive tape 400 with the above specifications (i.e., a PET scrim layer 102 of approximately 50 μm, a fiberglass first fabric layer 402 with a grammage of approximately 55 g/m², a nonwoven second fabric layer 404 with a grammage of approximately to 25 g/m², a first adhesive layer 406 with a grammage of approximately 25 g/m², a second adhesive layer 408 with a grammage of approximately 35 g/m², and a third adhesive layer 410 with a grammage of approximately 125 g/m²) can have a thickness of 310 μm, an adhesion strength of 60 N/25 mm, a tensile strength of 1020 N/50 mm and an FOB cost of $1.90. Further the high strength adhesive tape 400 would resist deformation, as described below.

Figure 5:
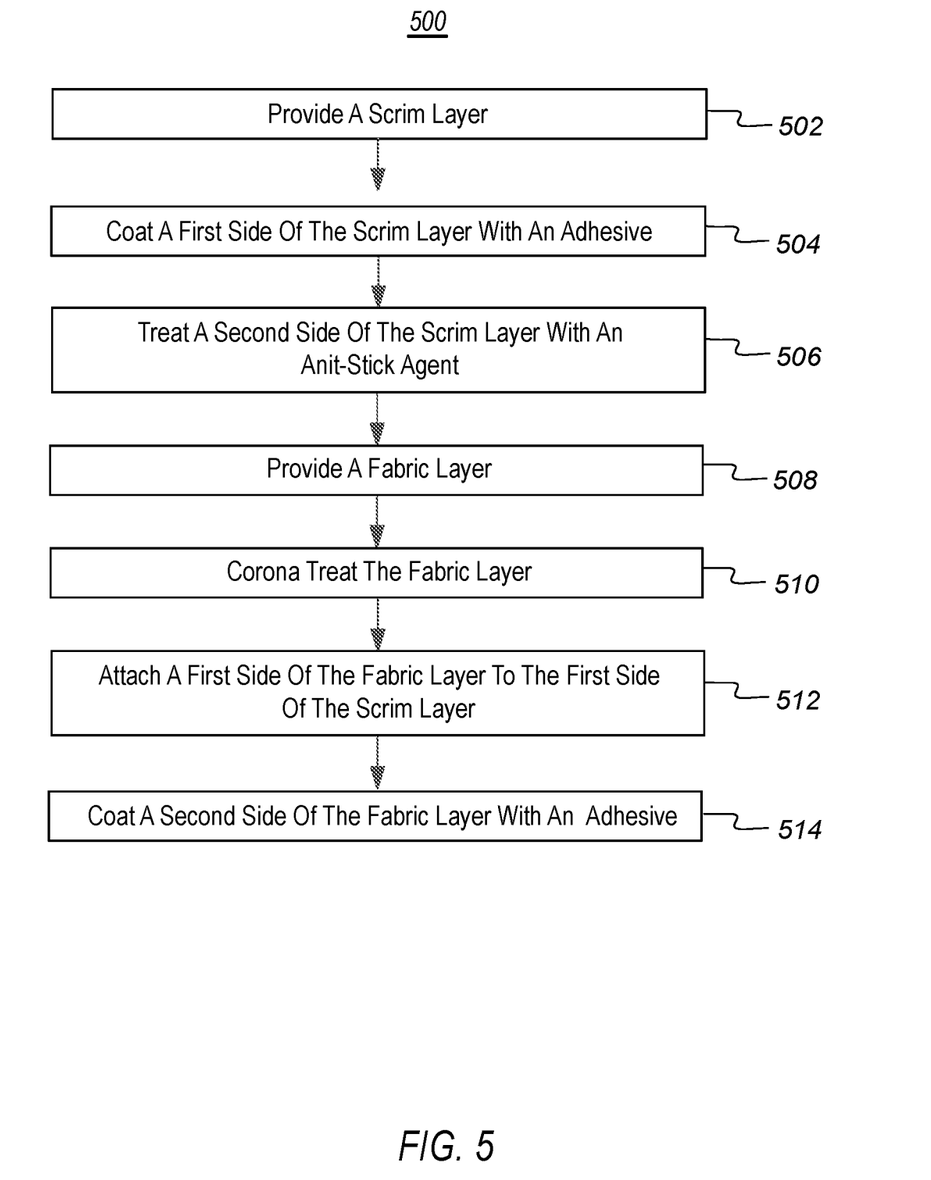
FIG. 5 is a flow chart illustrating a method of manufacturing a high strength adhesive tape.

FIG. 5 is a flow chart illustrating a method 500 of manufacturing a high strength adhesive tape. In at least one implementation, the high strength adhesive tape can include the high strength adhesive tape 100 FIG. 1. Therefore, the method 500 will be described, exemplarily, with reference to the high strength adhesive tape 100 of FIG. 1. Nevertheless, one of skill in the art can appreciate that the method 500 can be used to produce high strength adhesive tape other than the high strength adhesive tape 100 of FIG. 1.

FIG. 5 shows that the method 500 can include providing 502 a scrim layer. The scrim layer can include any desired pattern for the outer portion of the high strength adhesive tape. For example, the scrim layer can include a clear film, designs, colors, images or any other desired aesthetic. The scrim layer can include any desired materials, as described above.

FIG. 5 also shows that the method 500 can include coating 504 a first side of the scrim layer with an adhesive. The adhesive can include any desired adhesive, such as a pressure sensitive adhesive, as described above. For example, the pressure sensitive adhesive can be configured to withstand temperatures in which the tape will be used or transported, as described below. As used in the specification and the claims, the phrase "configured to" denotes an actual state of configuration that fundamentally ties recited elements to the physical characteristics of the recited structure. That is, the phrase "configured to" denotes that the element is structurally capable of performing the cited element but need not necessarily be doing so at any given time. Thus, the phrase "configured to" reaches well beyond merely describing functional language or intended use since the phrase actively recites an actual state of configuration.

FIG. 5 further shows that the method 500 can include treating 506 a second side of the scrim layer with an anti-stick agent, where the second side of the scrim layer is opposite the first layer. The anti-stick agent can allow for applications where the "outer surface" of the high strength adhesive tape should not be subject to adhesion. I.e., when the tape is rolled, any glue on the inner surface of any layer should not adhere to the outer layer of the scrim (otherwise the tape would become a solid block).

One example of an anti-stick agent includes a silicone release agent. One of the key properties of silicone is its low surface tension—in particular, its low critical surface tension of wetting (or low surface energy). This combines with the low cohesive strength conferred by its methyl groups to give silicone excellent anti-stick characteristics. Unlike more rigid carbon-carbon backbones, silicone polymers can easily expose their low-interacting/surface-active methyl groups to provide low adhesion, or easy release.

FIG. 5 additionally shows that the method 500 can include providing 508 a fabric layer. The fabric layer provides strength to the high strength adhesive tape. I.e., the fabric layer provides the bulk of the strength that prevents tearing or ripping of the high strength adhesive tape and resists deformation when a repair is made with the high strength adhesive tape. The fabric layer can include any desired design. E.g., the scrim layer can be clear to allow the design of the fabric layer to be seen by a user.

FIG. 5 moreover shows that the method 500 can include corona treating 510 the fabric layer. Corona treatment (sometimes referred to as air plasma) is a surface modification technique that uses a low temperature corona discharge plasma to impart changes in the properties of a surface. The corona plasma is generated by the application of high voltage to an electrode that has a sharp tip, where the plasma forms at the tip. A linear array of electrodes is often used to create a curtain of corona plasma. Many plastics, such as polyethylene, polypropylene, and polyethylene fabric have chemically inert and nonporous surfaces with low surface tensions causing them to be non-receptive to bonding with printing inks, coatings, and adhesives. Although results are invisible to the naked eye, surface treating modifies the surface of the fabric to improve adhesion.

FIG. 5 also shows that the method 500 can include attaching 512 a first side of the fabric layer to the first side of the scrim layer. That is the adhesive layer coated 504 on the first side of the scrim layer is used to attach the scrim layer to the fabric layer. The adhesive is then allowed to cure so as the secure the scrim layer and the fabric layer relative to one another.

FIG. 5 further shows that the method 500 can include coating 514 a second side of the fabric layer with an adhesive. The adhesive can include any desired adhesive such as a pressure sensitive adhesive, as described above. For example, the pressure sensitive adhesive can be configured to withstand temperatures in which the tape will be used or transported, as described below. The adhesive on the second side of the adhesive layer is left to allow the high strength adhesive tape to adhere to an external object.

One skilled in the art will appreciate that for a tape of more than one fabric layer (such as the high strength adhesive tape 300 of FIG. 3 and the high strength adhesive tape 400 of FIG. 4) the steps 508-514 can be repeated as necessary.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

One of skill in the art will further appreciate that the gram mages and thicknesses described above can be critical to providing the characteristics needed for a high strength adhesive tape. In particular, using fabric of a different grammage or scrim layer of different thickness can lead to delamination on the ends and the adhesive squeezing out the sides when the high strength adhesive tape is subjected to high temperatures. This is a result of expansion of the PET scrim and PE fabric expanding at different rates. Thus, the expansion rate of the PET scrim and the PE fabric can be critical for allowing the tape to be used in various temperatures.

Figure 6:
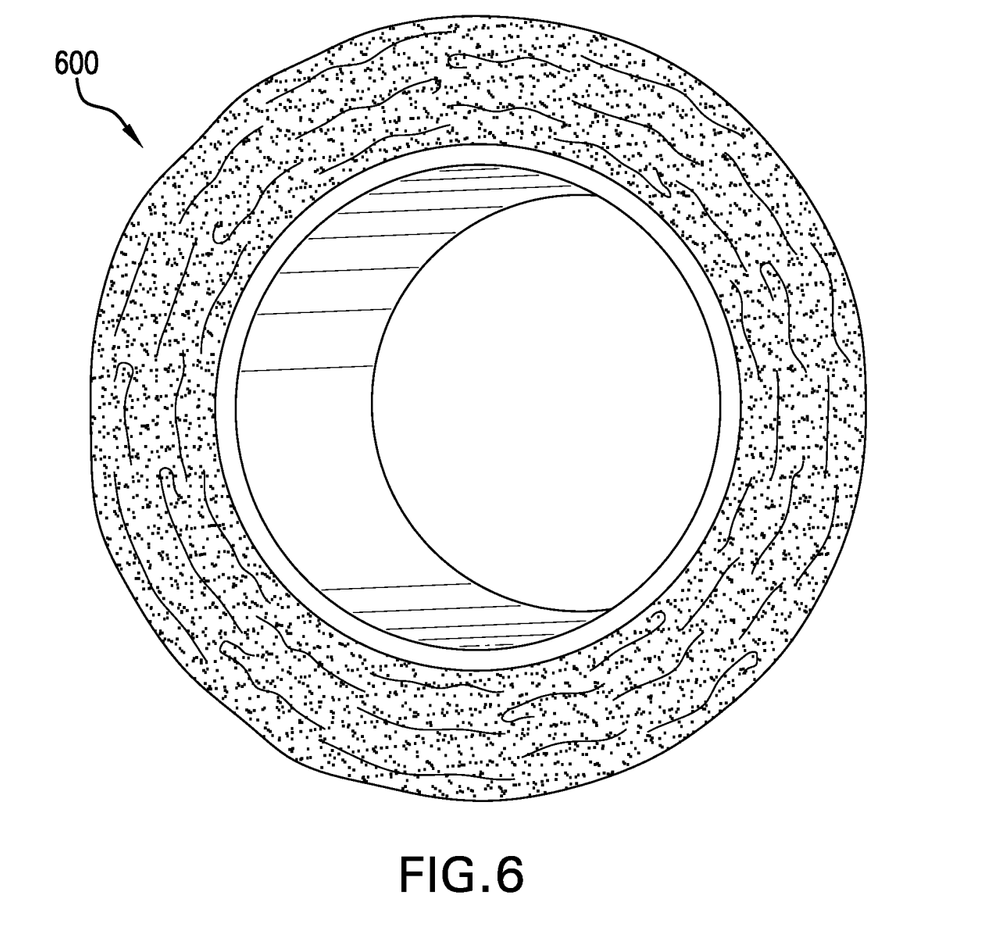
FIG. 6 shows a tape that included a higher grammage of fabric layer and was subjected to a temperature of 140° F. for 10 hours.

For example, FIG. 6 shows a tape 600 that included a higher grammage of fabric layer and was subjected to a temperature of 140° F. for 10 hours. The sticky black residue on the top face of the roll is adhesive that has been squeezed from between the layers as the PET scrim and the PE fabric expanded at different rates.

Figure 7:
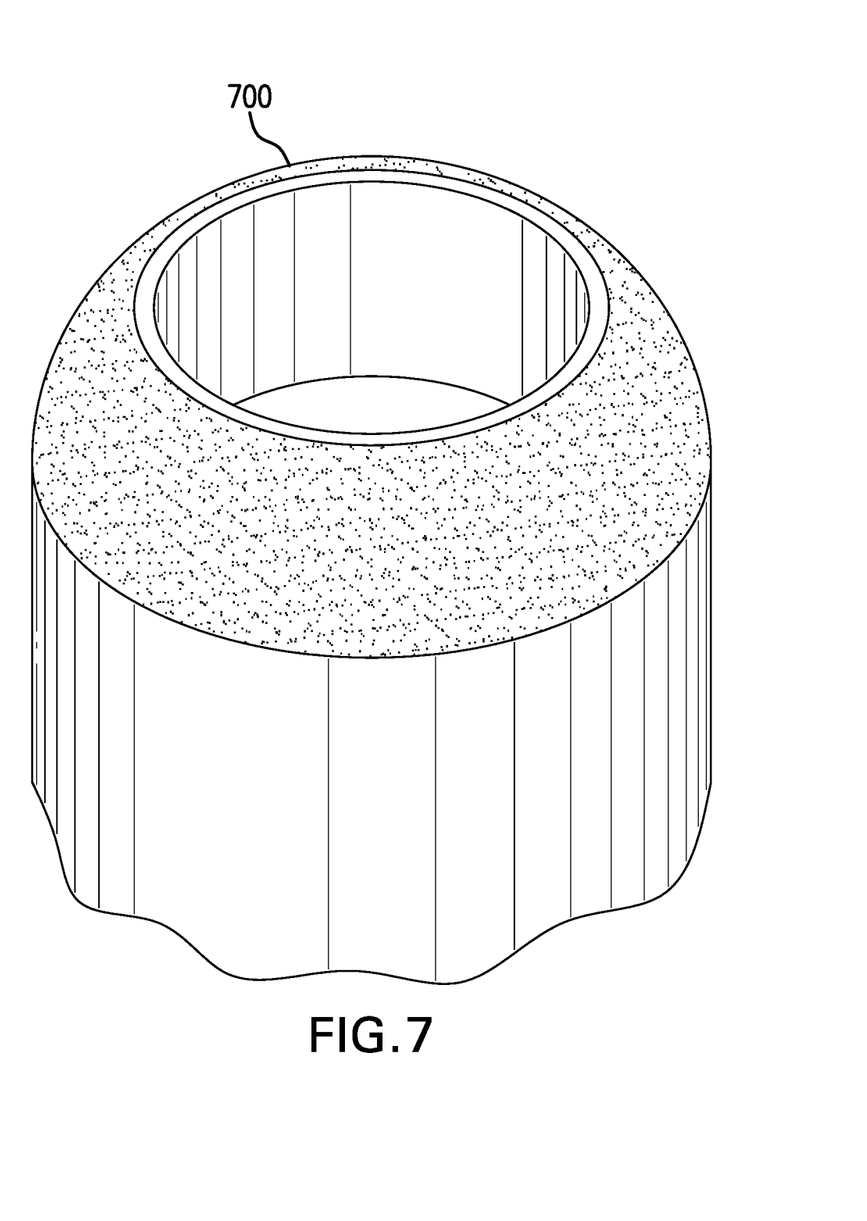
FIG. 7 shows a tape that included a higher grammage of fabric layer and was subjected to a temperature of 200° F. for 30 minutes.

Likewise, FIG. 7 shows a tape 700 that included a higher grammage of fabric layer and was subjected to a temperature of 200° F. for 30 minutes. The tape 700 has telescoped and delaminated as the PET scrim and the PE fabric expanded at different rates. The inside of shipping containers regularly is up to 540° F. above ambient temperatures. Thus, the higher grammage means that the high strength adhesive tape requires special shipping methods, which greatly increases the cost.

One of skill in the art will appreciate that lower grammages not only reduce the strength of the tape, but also can cause the same expansion problems as shown above in FIGS. 6 and 7. Thus, the grammages of the adhesive and fabric layer and the thickness of the scrim layer must be balanced to provide the necessary strength while preserving similar expansion rates.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A high strength adhesive tape having an upper surface and a lower surface, with the lower surface configured for adhering to an external object, the high strength adhesive tape comprising:
  a scrim layer on the upper surface;
  a fabric layer between the upper surface and the lower surface;
  a first adhesive layer between the scrim layer and the fabric layer, wherein the first adhesive layer attaches the fabric layer to the scrim layer; and
  a second adhesive layer on the side of the fabric layer opposite to where the fabric layer is attached to the scrim layer.

2. The high strength adhesive tape of claim 1, wherein the second adhesive layer forms the lower surface of the tape and is configured to form a bond between the high strength adhesive tape and the external object.

3. The high strength adhesive tape of claim 1, wherein expansion rate of the scrim layer is approximately equal to an expansion rate of the fabric layer.

4. The high strength adhesive tape of claim 1, wherein the scrim layer comprises a film.

5. The high strength adhesive tape of claim 4, wherein the scrim layer comprises a polyethylene terephthalate film.

6. The high strength adhesive tape of claim 4, wherein the film is transparent.

7. The high strength adhesive tape of claim 4, wherein the film comprises designs of an aesthetic nature or is colored.

8. The high strength adhesive tape of claim 1, wherein the scrim layer comprises a fabric.

9. The high strength adhesive tape of claim 1, wherein the scrim layer is between 40 μm and 60 μm thick.

10. The high strength adhesive tape of claim 9, wherein the scrim layer is approximately 50 μm thick.

11. The high strength adhesive tape of claim 1, wherein the fabric layer comprises polyethylene fabric.

12. The high strength adhesive tape of claim 1, wherein a grammage of the fabric layer is between 85 g/m$^2$ and 130 g/m$^2$.

13. The high strength adhesive tape of claim 12, wherein a grammage of the fabric layer is between 105 g/m$^2$ and 110 g/m$^2$.

14. The high strength adhesive tape of claim 1, wherein the first adhesive layer comprises a pressure sensitive adhesive.

15. The high strength adhesive tape of claim 1, wherein a grammage of the first adhesive layer is between 45 g/m² and 65 g/m².

16. The high strength adhesive tape of claim 15, wherein a gram mage of the first adhesive layer is approximately 55 g/m².

17. The high strength adhesive tape of claim 1, wherein the second adhesive layer comprises a pressure sensitive adhesive.

18. The high strength adhesive tape of claim 1, wherein a grammage of the second adhesive layer is between 70 g/m² and 100 g/m².

19. The high strength adhesive tape of claim 18, wherein a gram mage of the second adhesive layer is approximately 85 g/m².

20. A method of producing a high strength adhesive tape, the method comprising:
    providing a scrim layer;
    coating a first side of the scrim layer with an adhesive;
    treating a second side of the scrim layer with an anti-stick agent, wherein the second side of the scrim layer is opposite the first layer;
    providing a fabric layer;
    attaching a first side of the fabric layer to the first side of the scrim layer using the adhesive on the first side of the scrim layer; and
    coating a second side of the fabric layer with an adhesive, wherein the second side of the scrim layer is opposite the first layer.

21. The method of claim 20, further comprising the step of corona treating the fabric layer.

22. The method of claim 20, wherein attaching the first side of the fabric layer to the first side of the scrim layer includes allowing the adhesive to cure.

23. The method of claim 20, wherein the anti-stick agent comprises a silicone release agent.

24. The method of claim 20, wherein the fabric layer includes a design or is colored.

25. The method of claim 20, wherein the scrim layer is transparent.

* * * * *